(12) United States Patent
Vizgaitis

(10) Patent No.: US 7,082,001 B2
(45) Date of Patent: Jul. 25, 2006

(54) DUAL MODE MIRROR IMAGING SYSTEM

(75) Inventor: Jay N. Vizgaitis, Alexandria, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 52 days.

(21) Appl. No.: 10/813,068

(22) Filed: Mar. 31, 2004

(65) Prior Publication Data

US 2005/0225881 A1    Oct. 13, 2005

(51) Int. Cl.
*G02B 17/00* (2006.01)

(52) U.S. Cl. .................................... 359/729
(58) Field of Classification Search ......... 359/727–732
See application file for complete search history.

(56) References Cited

U.S. PATENT DOCUMENTS 4,411,499 A * 10/1983 Abel et al. ................. 359/729
5,114,238 A * 5/1992 Sigler ........................ 359/728
5,161,051 A * 11/1992 Whitney et al. ............ 359/731
6,118,583 A    9/2000 Rogers
6,262,849 B1   7/2001 Potin et al.
6,366,399 B1   4/2002 Rogers
2002/0105724 A1* 8/2002 Sugiyama ................... 359/399

* cited by examiner

*Primary Examiner*—Alicia M Harrington
(74) *Attorney, Agent, or Firm*—William H. Anderson

(57) ABSTRACT

A dual mode mirror imaging system is described having a Cassegrain-type objective assembly having a primary mirror with a hole in its center and a secondary mirror spaced in front of the primary mirror, and imager optics disposed in the hole. The secondary mirror is adapted to receive laser wavelength light and infrared wavelength light reflected from the primary mirror and to reflect the light back through the imager optics to focal plane. The secondary mirror has one reflecting surface for the laser light and another reflecting surface for the infrared light. The pair of reflecting surface is positioned to change the optical path length between the laser light and the infrared light so that the laser light and the infrared light are imaged at the same focal plane without defocusing.

16 Claims, 3 Drawing Sheets

DUAL MODE MIRROR IMAGING SYSTEM

GOVERNMENT INTEREST

The invention described herein may be manufactured, used, sold, imported, and/or licensed by or for the Government of the United States of America.

BACKGROUND OF THE INVENTION

This invention relates in general to optical devices, and more particularly, to optical imaging systems.

The use of multi-spectral systems is becoming more common with the development of new focal plane arrays.

One such application is the ability to see the laser spot of a laser while imaging in the mid-wave infrared band. This "see-spot" capability is extremely useful for bore-sighting a laser to an imaging system. By enabling the "see-spot" in the infrared, bore-sighting is possible both at night and during the day.

Multi-spectral designs are often limited to all reflective designs because of axial chromatic aberration. All-reflective designs may contain off-axis mirrors, taking up a large volume and providing difficult tolerances. This would make it extremely risky to build a production type system that fits into a small volume.

SUMMARY OF THE INVENTION

It is therefore an object of this invention to image at both mid-wave infrared wavelengths and at a laser wavelength without having to use an off-axis all-reflective design.

This and other objects of the invention are achieved in one aspect by a dual mode mirror imaging system. The imaging system comprises a Cassegrain-type objective assembly having a primary mirror with a hole in its center and a secondary mirror spaced in front of the primary mirror, and imager optics disposed in the hole. The secondary mirror is adapted to receive laser wavelength light and infrared wavelength light reflected from the primary mirror and to reflect the light back through the imager optics to a focal plane. The secondary mirror has one reflecting surface for the laser light and another reflecting surface for the infrared light. The pair of reflecting surfaces is positioned to change the optical path length between the laser light and the infrared light so that the laser light and the infrared light are imaged at the same focal plane without defocusing.

Another aspect of the invention involves a dual mode mirror imaging method. The method comprises the steps of reflecting laser wavelength and infrared wavelength light from a primary mirror of a Cassegrain-type objective assembly onto a secondary mirror of the Cassegrain-type objective assembly, reflecting the laser light from one surface of the secondary mirror back through imager optics in a hole in the primary mirror to a focal plane, and reflecting the infrared light from another surface of the secondary mirror back through imager optics in a hole in the primary mirror to a focal plane. The pair of reflecting surfaces is positioned to change the optical path length between the laser light and the infrared light so that the laser light and the infrared light are imaged at the same focal plane without defocusing.

Additional advantages and features will become apparent as the subject invention becomes better understood by reference to the following detailed description when considered in conjunction with the accompanying drawings wherein:

WRITTEN DESCRIPTION OF THE PREFERRED EMBODIMENT

Figure 1:
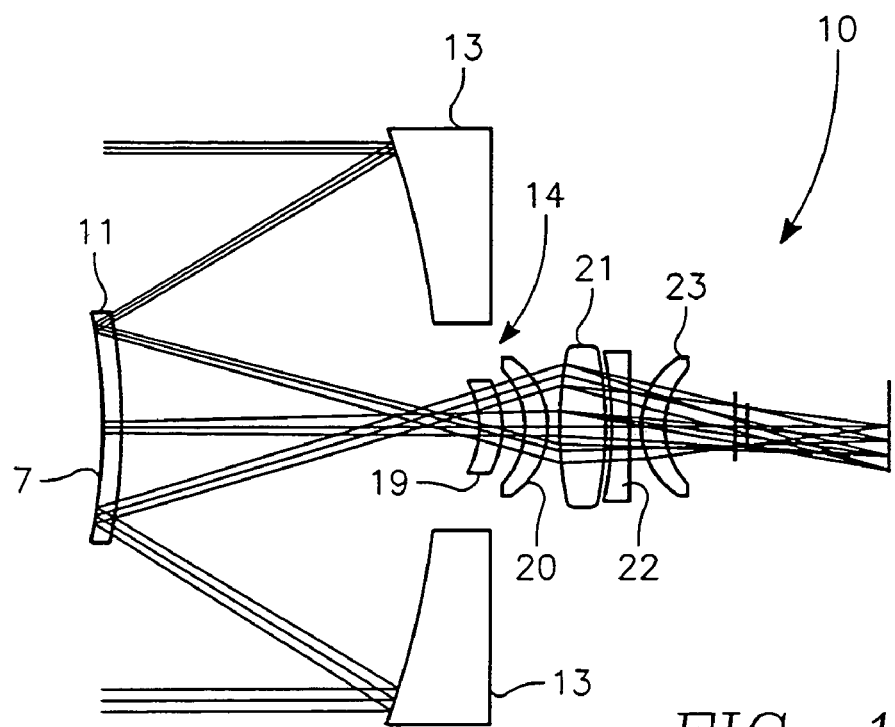
FIG. 1 is a schematic illustration of a dual mode mirror imaging system embodying the invention showing its action for infrared light.
Figure 2:
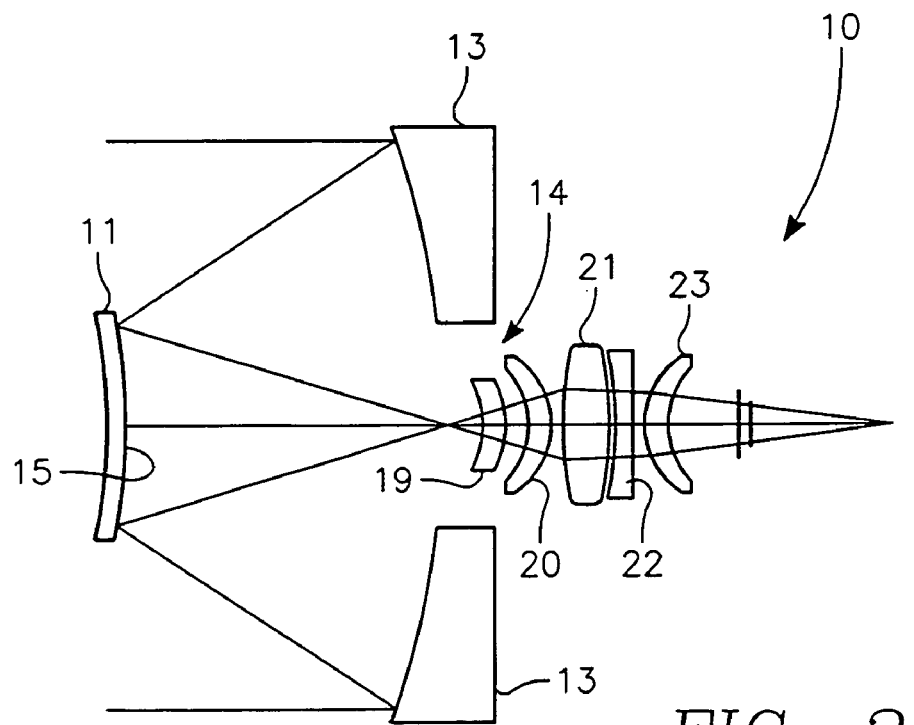
FIG. 2 is a schematic illustration of a dual mode mirror imaging system embodying the invention showing its action for laser light.

Referring to the Figures, wherein like reference numerals designate like or corresponding parts, an embodiment of the dual mode mirror imaging system 10 is illustrated in FIG. 1 and FIG. 2. FIG. 1 shows the action of the imaging system for the 3.9 to 5.0 micron mid-wave infrared band wavelengths, and FIG. 2 shows the action of the imaging system for the 1.06 micron laser. A two mirror Cassegrain type objective assembly is used, utilizing two aspheric mirrors. The primary mirror 13 is an aluminum mirror with a hole 14 removed from its center for the imager optics. The secondary mirror 11 is a convex Mangin mirror made out of germanium. The primary and secondary mirror interact to provide an infrared imaging system with laser see spot capability as more fully described hereinafter.

Figure 3:
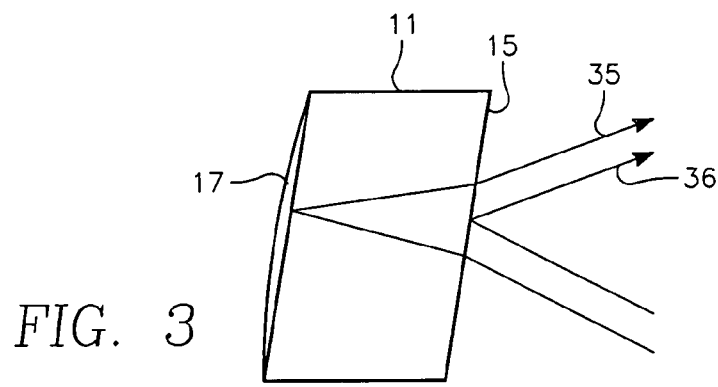
FIG. 3 illustrates the action of the dual mode action of the secondary mirror.

FIG. 3 illustrates the action of the dual mode mirror 11 that enables this system to image a 1.06 micron laser and wavelengths in the 3.9 to 5.0 micron infrared band. Referring now primarily to FIG. 3, the secondary mirror 11 is shown in greater detail. Specifically, the secondary mirror is constructed so that it has two separate reflecting surfaces, first surface 15 and second surface 17. To do this, the secondary mirror is preferably made of a Germanium material, because it will transmit radiation between 1.8 to 23 microns (which includes 3.9–5.0 micron infrared wavelengths), but reflect the 1.06 micron laser wavelength. Next, second surface 17 of the germanium is coated with silver in order to reflect the infrared light back through the rest of the system. With this configuration, laser radiation 36 is reflected off of the first surface 15. At the same time, infrared radiation 35 transmits through the mirror, is reflected off of the second surface 17 and back through the mirror. Thus, a dual infrared and laser mode is established for the secondary mirror.

The secondary mirror is preferably 2 mm thick and has a slightly different curvatures for first surface 15 and second surface 17. The difference curvatures allow for the different refractive properties of infrared and laser radiation and allows for imaging of both infrared and laser radiation at the same focal plane. If the first surface 15 and second surface 17 has the same curvature, or if one common reflective surface were used, then either the laser or the infrared light would be defocused, depending on the optimization of the design.

As mentioned above, having the germanium dual mode mirror changes the path length between the two wavelengths and enables them to be imaged at the same focal plane. In addition to the change in path lengths, the curvatures of each reflective surface are optimized for the best image quality at both wavelengths. These surfaces are also aspheric which improves the image quality even further. Both the aluminum mirror and the germanium are able to be diamond-turned. This allows for manufacturing of these mirrors in a relatively cost-effective manner.

It is necessary to provide the thin secondary mirror with a support structure to protect it against shock and vibration. This support structure (not shown) fits on the back side of the germanium element, behind the silver coating, and has the same curvature as the back surface (second surface 17) of the germanium element. Two requirements exist for this structure—a good thermal match, and machinability. Several materials exist that have similar linear coefficients of thermal expansion to germanium. Germanium's thermal expansion coefficient is $6.0\times10^{-6}$/K. BK7 glass offers a good match at $7.1\times10^{-6}$/K, and it is also machinable. The glass is cemented to the germanium element, and the glass becomes the attaching point to hold the element in place. This strengthens the element and provides an easy way of keeping it in place.

The imager optics includes five lenses 19–23, two zinc selenide (ZnSe) lenses and three gallium arsenide (GaAs) lenses. These two materials are preferred because they transmit in both the laser wavelengths and the mid infrared spectrums. ZnSe transmits from 0.5 to 22 microns and GaAs transmits from 0.9 microns to 13 microns. The second lens 21 is a GaAs diffractive lens with a center wavelength of 4.1 microns. All of the other lenses have spherical surfaces. This system is cold shielded and uses a 25 micron pitch detector with 640×480 elements. A notch in the cold filter is included to transmit the 1.06 micron wavelength.

Figure 4:
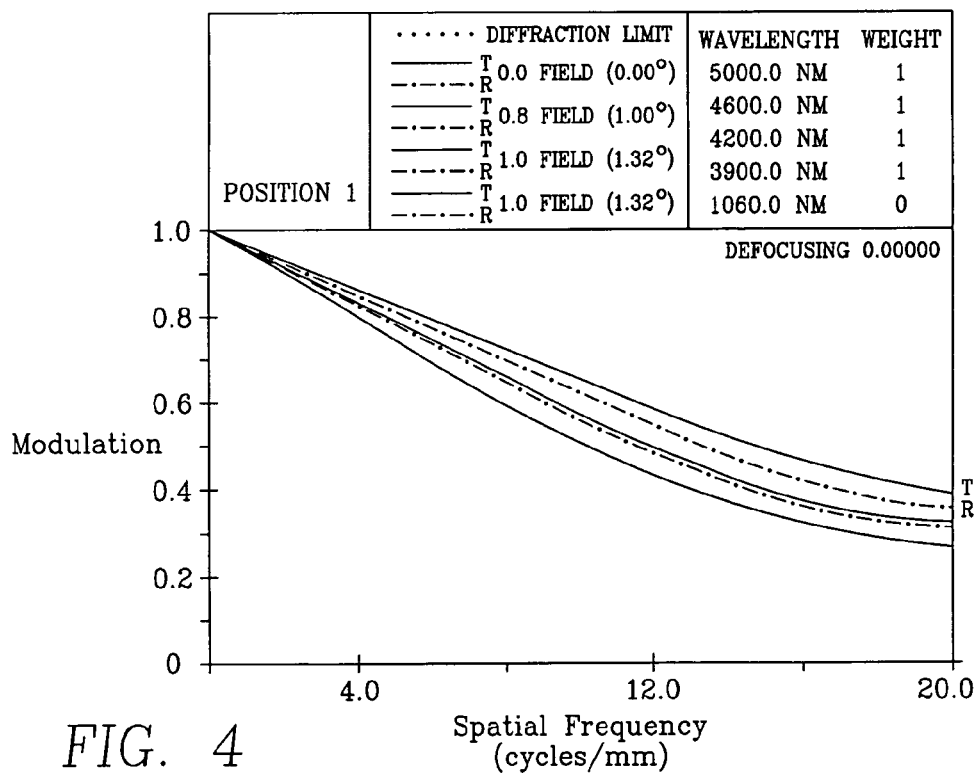
FIG. 4 is a graph that shows the modulation transfer function (MTF) for the infrared light for the dual mode mirror of FIG. 3.
Figure 5:
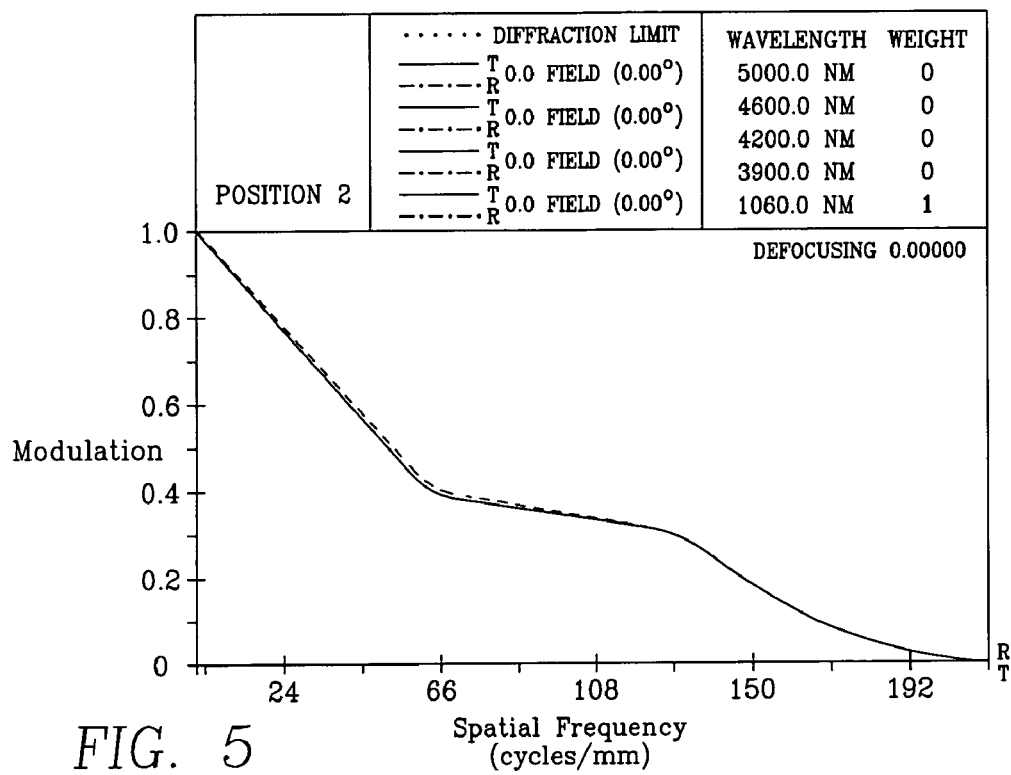
FIG. 5 is a graph that shows the modulation transfer function (MTF) for the laser light for the dual mode mirror of FIG. 3.

FIGS. 4 and 5 show the modulation transfer function (MTF) for 3.9 to 5.0 micron infrared light and 1.06 micron laser light, respectively, for an illustrative imaging system actually built and tested. The system has diffraction-limited resolution out past the cut-off frequency of 20 cycles/mm in both the infrared and laser wavelength.

Figure 6:
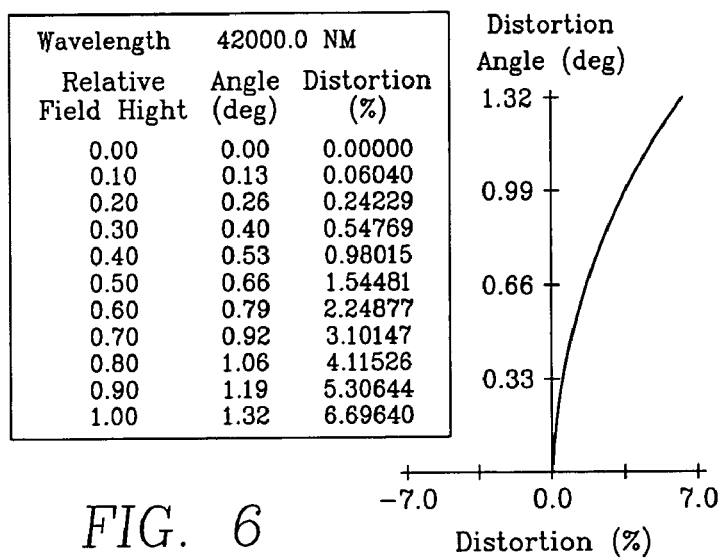
FIG. 6 is a graph that shows the distortion plots for the infrared design.

FIG. 6 shows the distortion plots for the infrared design. The system has a distortion of less that 4% at 0.7 of the field height for the infrared wave band.

It is obvious that many modifications and variations of the present invention are possible in light of the above teachings. For example, a similar design may be used with a 1.54 micron laser. The only variation will be in the curvatures, conic constant, and aspheric coefficients of the germanium dual mode mirror. All other facets of the design remain the same, and the same concept applies. The system performance will be similar to that of the 1.06 micron laser. The curvature change is used to re-optimize for that specific wavelength. It is therefore to be understood that within the scope of the appended claims, the invention may be practiced otherwise than as described.

What is claimed as new and desired to be secured by Letters Patent of the United States is:

1. A dual mode mirror imaging system comprising:
  a Cassegrain-type objective assembly having a primary mirror with a hole in its center, and a secondary mirror spaced in front of the primary mirror; and
  imager optics disposed in the hole in the center of the primary mirror, the imager optics has five lenses wherein three of lenses are made from gallium arsenide and one of the lenses is a diffractive lens with a center wavelength of 4.1 microns,
  the secondary mirror adapted to receive laser wavelength light and infrared wavelength light reflected from the primary mirror and to reflect the light back through the imager optics to a focal plane,
  the secondary mirror having one reflecting surface for the laser light and another reflecting surface for the infrared light;
  the pair of reflecting surfaces positioned to change the optical path length between the laser light and the infrared light so that the laser light and the infrared light are imaged at the same focal plane without defocusing.

2. The imaging system recited in claim 1 wherein the mirrors are aspheric mirrors.

3. The imaging system recited in claim 1 wherein the primary mirror is aluminum mirror.

4. The imaging system recited in claim 1 wherein the secondary mirror is a convex mirror.

5. The imaging system recited in claim 4 wherein the secondary mirror is a Mangin mirror.

6. The imaging system recited in claim 1 wherein the secondary mirror is made out of germanium.

7. The imaging system recited in claim 6 wherein the backside of the secondary mirror is coated with silver.

8. The imaging system recited in claim 1 wherein the secondary mirror is 2 mm thick.

9. The imaging system recited in claim 1 wherein the reflecting surfaces are aspheric.

10. The imaging system recited in claim 1 wherein two of the lenses of the imager optics are made from zinc selenide.

11. The imaging system recited in claim 1 wherein the other lenses of the imager optics have spherical surfaces.

12. The imaging system recited in claim 1 wherein the secondary mirror is a convex Mangin mirror.

13. The imaging system recited in claim 1 wherein the primary mirror is a aluminum mirror and the secondary mirror is made out of germanium.

14. The imaging system recited in claim 13 wherein the backside of the secondary mirror is coated with silver.

15. The imaging system recited in claim 13 wherein the reflecting surfaces are aspheric.

16. A dual mode mirror imaging system comprising:
  a Cassegrain-type objective assembly having a primary aspheric aluminum mirror with a hole in its center, and a secondary aspheric convex Mangin mirror spaced in front of the primary mirror; and
  imager optics including two zinc selenide lenses and three gallium arsenide lenses disposed in the hole in the center of the primary mirror, where one of the gallium arsenide lenses is a diffractive lens with a center wavelength of 4.1 microns,
  the secondary mirror adapted to receive laser wavelength light and infrared wavelength light reflected from the primary mirror and to reflect the light back through the imager optics to a focal plane,
  the secondary mirror having one germanium reflecting surface for the laser light and another silver reflecting surface for the infrared light;
  the pair of reflecting surfaces positioned to change the optical path length between the laser light and the infrared light so that the laser light and the infrared light are imaged at the same focal plane without defocusing.

* * * * *